3,108,123
PROCESS FOR THE PREPARATION OF THE 20-KETOXIME OF 16-DEHYDROPREGNENOLONE
Octavio Mancera, Mexico City, Mexico, assignor to Syntex Corporation, Panama, Panama, a corporation of Panama
No Drawing. Filed July 16, 1962, Ser. No. 210,214
Claims priority, application Mexico July 24, 1961
6 Claims. (Cl. 260—397.5)

The present invention relates to an improvement to the method for the manufacture of the 20-ketoxime of the acetate of 16-dehydropregnenolone.

The oxime is obtained from the acetate of 16-dehydropregnenolone, as illustrated by the following equation:

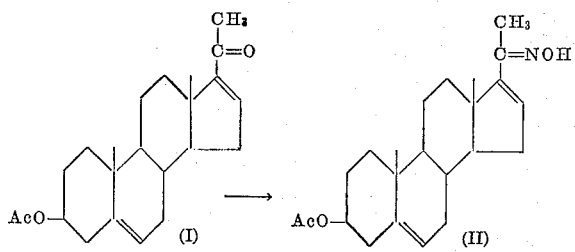

The oxime is an important precursor of dehydroisoandrosterone, which in turn serves as an intermediate product in the manufacture of the androgenic and estrogenic hormones.

The first formula corresponds to the acetate of 16-dehydro-pregnenolone and the second to the oxime of the same. All of the prior methods for preparing the oxime involve the reaction of the acetate of 16-dehydropregnenolone with hydroxylamine hydrochloride, preferably in alcohol solution. This reaction requires the presence of a dehydrohalogenating agent which takes up the hydrogen chloride liberated during the reaction. In the scientific and technical literature, there are described several reagents which are added with this purpose to the alcoholic solution: tertiary amines, and among them specifically pyridine, or alkali such as sodium or potassium hydroxide, or alkali salts such as sodium acetate.

In the case of the acetate of 16-dehydropregnenolone all of these reagents present inherent disadvantages, such as, for example, increasing the solubility of the oxime or producing an alkaline pH higher than desired, which favors the secondary reaction of ethoxylation of the C-16, 17 double bond. Both factors tend to lower the yields of the desired oxime. In the case of pyridine, another factor which should be considered further is its high price and the difficulty in obtaining it in the world markets in sufficient quantities.

It has been discovered that the reagents employed so far may be advantageously substituted by solid calcium carbonate, that is, in suspension. In the presence of this very cheap salt, it is not even necessary to dissolve the starting steroid, since it is possible to use it in alcoholic suspension, therefore saving a great amount of solvent. Under the conditions hereinafter described in detail, there is obtained in almost quantitative yield a product of satisfactory quality for all further transformations, and without traces of contamination with the undesired 16-ethoxy derivative.

The calcium carbonate may be substituted by other alkaline earth salts or oxides which are slightly soluble in alcohol, as are all the carbonates of the alkaline earth metals and magnesium oxide. Calcium oxide is quite soluble in alcohol, and thus it produces a too alkaline solution and therefore lower yields of the oxime.

The following examples serve to illustrate but are not intended to restrict the scope of the invention:

*Example I*

A suspension of 1 kg. of the acetate of 16-dehydropregnenolone in 4 lt. of 96° alcohol is heated to boiling under vigorous stirring, in order to break up the lumps of the substance. There is then added 150 g. of the precipitated calcium carbonate followed by 216 g. of hydroxylamine hydrochloride and the mixture is boiled under reflux for 1 hour, always under vigorous stirring. The mixture is cooled to room temperature and treated little by little with 150 cc. of concentrated industrial hydrochloric acid in order to dissolve the excess of calcium carbonate. The resulting thick suspension is filtered and the filtrate is distilled in order to recover the alcohol which may be employed again in other experiments. The precipitate of the oxime is washed with 1 lt. of alcohol and 10 lt. of hot water, and dried at 90° C. In this form, there is obtained between 900 g. and 1 kg. of the oxime of the acetate of 16-dehydropregnenolone, depending on the quality of the starting material employed, with M.P. 218–223° C.

*Example II*

In the preceding Example, there was substituted the calcium carbonate by magnesium oxide, thus obtaining the oxime of the acetate of 16-dehydropregnenolone in essentially the same yield.

*Example III*

In Example I, there was substituted the calcium carbonate by magnesium carbonate, thus obtaining the oxime of the acetate of 16-dehydropregnenolone in 88 to 92% yield.

I claim:

1. In the method of preparing the oxime of 16-dehydropregnenolone acetate the improvement comprising adding a compound selected from the group consisting of an alkaline earth metal carbonate and magnesium oxide to an alcohol solution of 16-dehydropregnenolone acetate and hydroxylamine hydrochloride.

2. The process of claim 1 wherein the alkaline earth metal carbonate is calcium carbonate.

3. In the method of preparing the oxime of 16-dehydropregnenolone acetate the improvement comprising refluxing 16-dehydropregnenolone acetate and hydroxylamine hydrochloride in alcohol solution with a compound selected from the group consisting of an alkaline earth metal carbonate and magnesium oxide.

4. The method of claim 3 wherein the alkaline earth metal carbonate is calcium carbonate.

5. The method of claim 3 wherein the alkaline earth metal carbonate is magnesium carbonate.

6. The method of claim 3 wherein the alkaline earth metal carbonate is dissolved by reaction with hydrochloric acid.

No references cited.